Figure 1:
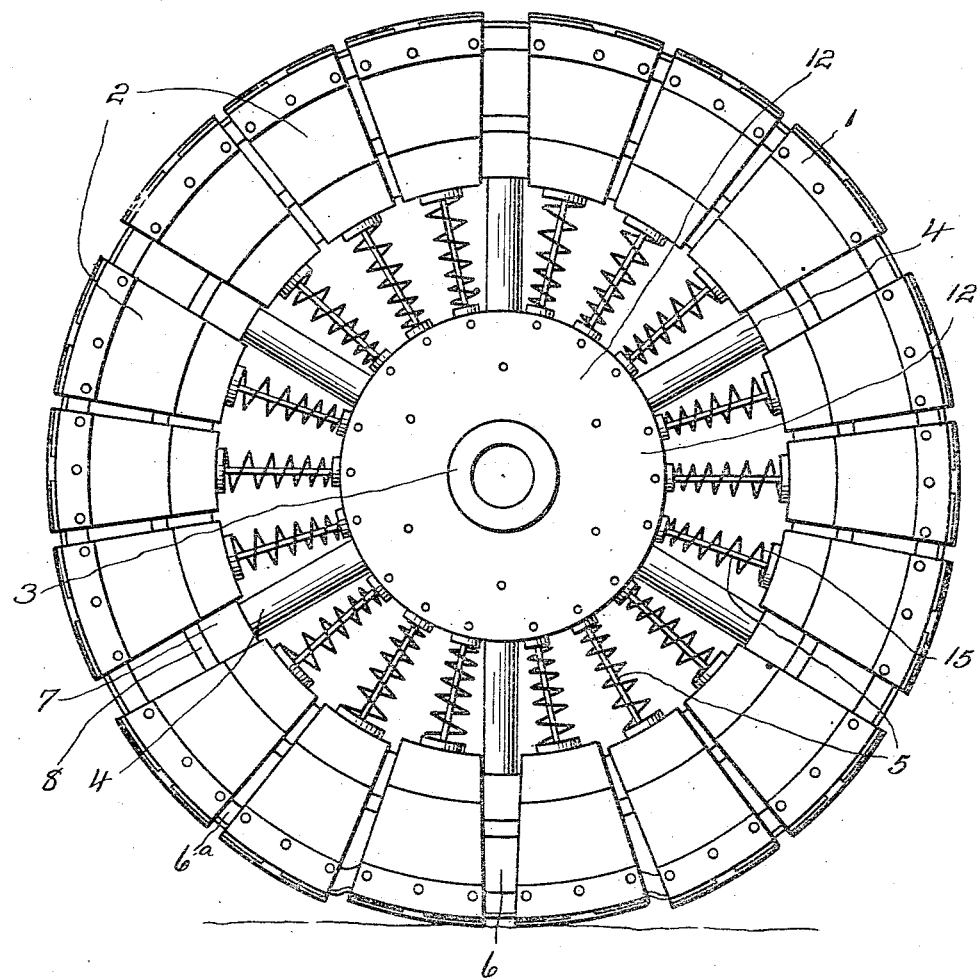

M. P. DYSART.
RESILIENT WHEEL.
APPLICATION FILED NOV. 26, 1913.

1,129,654.

Patented Feb. 23, 1915.
4 SHEETS—SHEET 1.

Witnesses
J. P. Britt
Jos. A. Ryan

Inventor
M. P. Dysart.
By
Attorneys

M. P. DYSART.
RESILIENT WHEEL.
APPLICATION FILED NOV. 26, 1913.
1,129,654.
Patented Feb. 23, 1915.
4 SHEETS—SHEET 2.
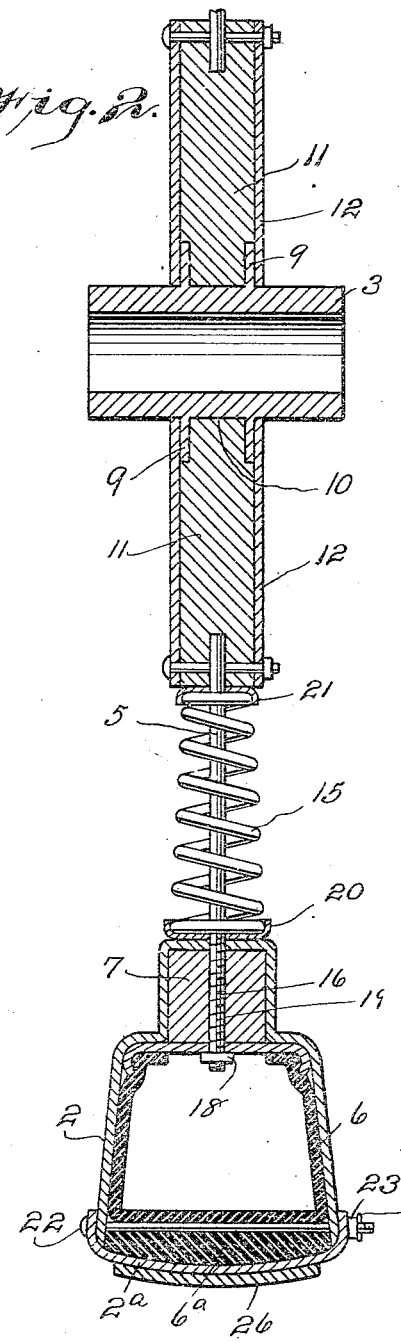
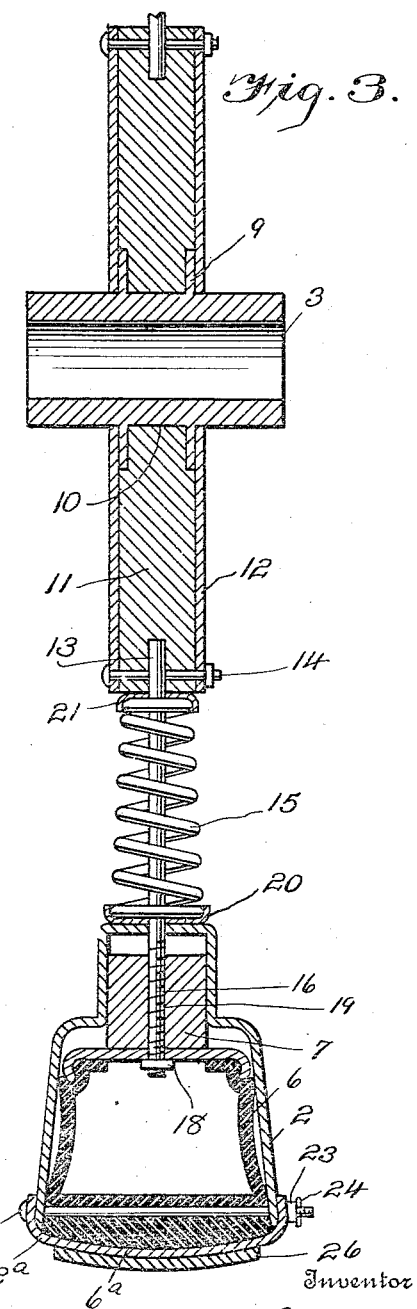
Witnesses
J. P. Britt
Jos. A. Ryan
Inventor
M. P. Dysart
By
Attorneys

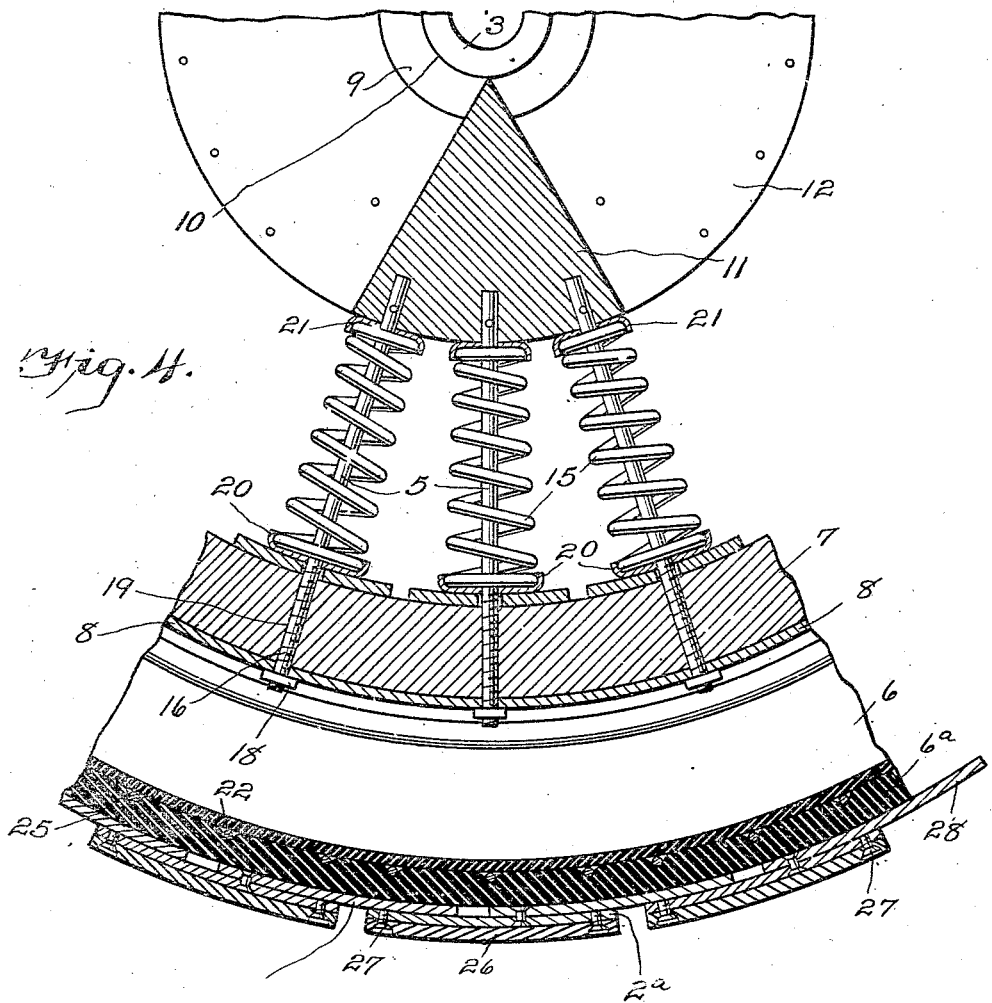
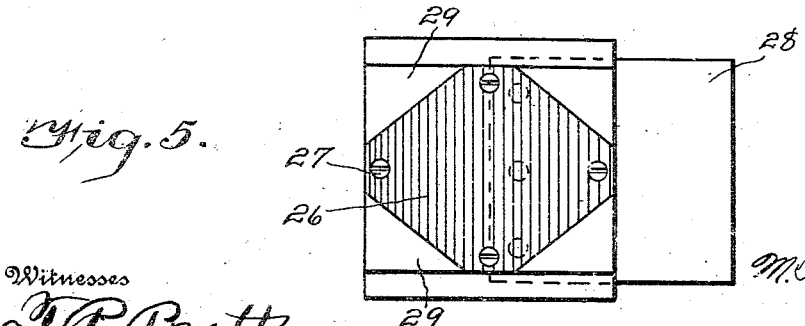

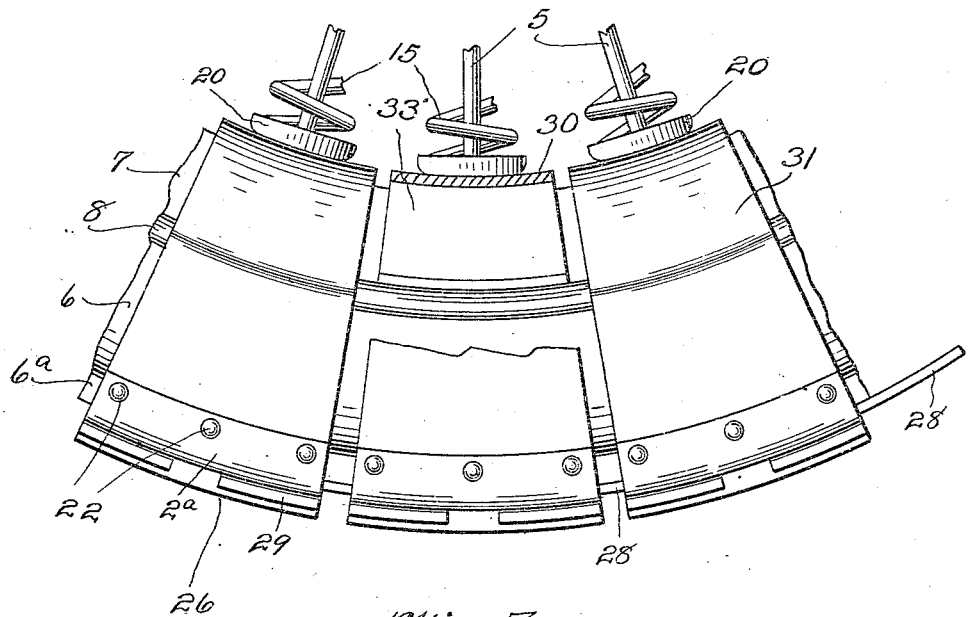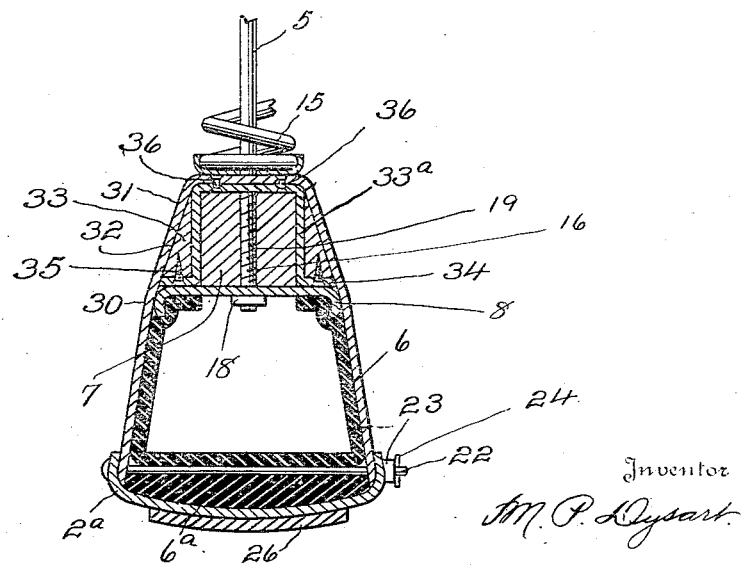

UNITED STATES PATENT OFFICE.

MARBY P. DYSART, OF SAN ANGELO, TEXAS.

RESILIENT WHEEL.

1,129,654.   Specification of Letters Patent.   Patented Feb. 23, 1915.

Application filed November 26, 1913. Serial No. 803,193.

*To all whom it may concern:*

Be it known that I, MARBY P. DYSART, a citizen of the United States, residing at San Angelo, in the county of Tom Green and State of Texas, have invented certain new and useful Improvements in Resilient Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in what may be termed resilient or spring wheels.

The invention has for its object particularly to substitute the ordinary pneumatic tire with adjustable or sectional rims.

A further object is to provide for the requisite resiliency in the wheel to compensate for concussions incident to usual travel.

A still further object is to render the wheel practically noiseless and easy running.

A still further object is to provide for lightness and yet enable the wheel to maintain the proper balance and to provide for the proper distribution of the load placed thereon.

A still further object is to carry out the aforesaid ends in a simple, economical and effective manner.

In the accompanying drawings is illustrated the preferred embodiment of my invention wherein it will be understood that various changes and modifications as to the detailed construction and arrangement of parts may be made without departing from the spirit of the invention, and in which drawings—

Figure 1 is a side view of my improved resilient or spring wheel. Figs. 2 and 3 are detailed vertical sections of the wheel illustrative more particularly of the resilient shoe and its accessories, one view or figure showing the position of the parts as when under a load. Fig. 4 is a fragmental partly sectional and partly side view of the like parts of the wheels taken in a plane at right angles to that of the latter views or figures. Fig. 5 is a plan view of an anti-skidding member or equipment for the wheel. Figs. 6 and 7 are fragmental side and sectional views of a modified form of shoe, the several figures including 2 to 7 being taken on an enlarged scale.

In carrying out my invention, I suitably organize the wheel, designated generally as 1, principally of a number or plurality of individual members 2 which may be termed shoes or segments, a central member or hub 3, tubular spokes 4, (preferably six being employed,) steel rods 5 intermediate the shoes and the hub, the rods and shoes each being arranged in groups of three between the spokes, a chilled steel tread members $2^a$ and 28 (Fig. 4), resilient tire 6, a felly 7, a clencher rim 8 and a rubber tread cover $6^a$.

The hub 3 has integral therewith spaced-apart annular members 9 forming an annular socket 10 into which is inserted the inner edge or portion of a preferably wooden core or filling-in pieces 11 having laterally secured thereto metal disks or plates 12, thus combining strength or durability and lightness. In between the core or filling-in pieces 11 are firmly seated the inner ends of the spokes 4 the opposite ends of said spokes being secured or seated into the felly 7, these referred to parts or members having fixed relation. The rods 5, whose inner ends are let into sockets 13 in the outer edges of the wooden cores or filling in pieces 11 extending to the hub, and suitably secured therein by nut-equipped bolts 14 passed transversely therethrough and said cores or filling-in pieces, provide for the seating or interposing of resilient members 15 preferably in the form of spiral or helical springs between said filling-in pieces or cores and the shoes 2. The outer ends of said rods 5 are passed through the inner ends of the shoes 2, the felly 7 and the clencher rim 8 of the resilient tubular member 6, said felly clencher rim and tubular member all being received or encompassed by said shoes, said outer ends of the rods 5 being threaded as at 16 and equipped with a nut 18. The nut 18 engages the threaded surface 16 of the rods 5 of the felly 7 and is applied to the clencher rim 8, as clearly seen in Figs. 2 and 3. The springs 15 are seated at their ends in cup-like washers 20 and 21 applied to the rods 5 and resting or bearing upon the filling-in pieces or core 11 and the shoes, respectively, for the retention of said springs against lateral displacement. By means of the aforesaid arrangement of parts it will be noted that the connection between the shoes and the wheel center or hub is rendered resilient whereby such connection is contracted and allowed to expand as conditions call for, as when a load is applied to or removed from the wheel, as will be understood from Figs. 2 and 3, while the elastic or rubber tread 6ᵃ provides for variable or independent movement between the individual shoes as the wheel contacts with the surface or ground when in rotation, as will be seen by reference to Fig. 1, and whereby rebounding or bumping action of the wheel as it contacts with irregularities of the ground and obstacles may be compensated for in its travel.

The rubber or elastic tread 6ᵃ is suitably held or secured in position together with the outer members or caps 2ᵃ of the shoes 2 by means of bolts 22 passed through and effecting connection between the main or body portions of the shoes and said cap members, the bolts themselves being equipped with nut and cotter pin fastenings 23 and 24 respectively, as seen particularly in Figs. 2 and 3. The bolts 22, it will be noted, are received in transverse grooves 25 produced in the rubber tread 6ᵃ at suitable intervals therein for the suitable retention thereof, in effective position as will be seen by reference to Fig. 4.

Suitable non-skidding members 26 of roughened, ribbed or corrugated pieces of material, preferably of the shape indicated or shown, are suitably applied to the periphery of the wheel, the same being preferably constituted as shown and detachably secured by screws 27 to additional members 28 applied or secured to the tread member 6ᵃ, said additional members breaking joints with said non-skidding members and having lateral flanges 29 serving to guard the latter against lateral displacement, as would likely occur if said non-skidding members were not guarded at those points.

In the modification as suggested by Fig. 7 a departure from the preferred form or disclosure of the shoe is shown, wherein it will be noted that the stepped or reduced inner end portion of the shoe is encompassed or inclosed by extending the lateral portions 30 of the shoe inwardly along converging lines as at 31 and over said end, the resultant lateral spaces 32 being filled in with hard wood cores 33, thus reinforcing or strengthening the shoe at that point. The continuous stepping of the lateral portions of the shoe is substituted by the use of a separate end inclosing member 33ᵃ having its inner ends terminated into lateral flanges 34 through which are inserted screws 35 entering the cores or filling-in pieces 33 for suitably assembling and aiding the retention of the latter in position and which flanges rest upon the clencher rim. Also the separate end inclosing member 33ᵃ and that portion 31 of the shoe 30 fitting thereover are suitably riveted or secured together as at 36.

As will be seen from Fig. 4 each outer member 2ᵃ is connected to its individual member or section 28, which latter members or sections are resilient. This allows each individual member or shoe 2 and its coöperating parts to move radially of the wheel without necessarily communicating its movement to the adjacent shoes 2. By means of this construction the periphery or tread of the wheel is capable of conforming to the contour of the surface of the road in the same manner as obtains in the use of pneumatic tires; that is to say, the shock is taken and absorbed directly at the point of contact by a sudden altering of the tread to conform to the contour or irregularity of the road-way, so that the wheel is not forced to climb up over small irregularities or obstacles in the road-way as must occur in all resilient wheels having a rigid tread or periphery.

It is further observed that my invention which is from the very nature of its general constituent parts, puncture-proof eliminates, as previously indicated, the use of the pneumatic tire together with its accessories including the demountable rim; it is characteristic for its load carrying capacity, being durable and free from parts liable to become prematurely weakened and inefficient. In event, however, of a spring becoming broken the wheel will not at once be rendered useless and cause the turning over of the car or machine but will allow of the latter being driven to a convenient point for the repair or replacing of the broken member. Also in the use of my invention it does away with the necessity of loading down the car with wheels and tires as usual against an emergency, while the car is possessed of a degree of resiliency which will promote the comfort of its occupants and make it easier for the running of the machine.

Having thus fully described the invention what I claim as new and desire to secure by Letters Patent is:—

1. A wheel of the type described, including a hub, a felly and rim, and spokes effecting connection between the hub and felly a resilient tire, tubular segments closely embracing said tire and felly and extending beyond the same, means effecting connection between the tire and felly, said segments having radially slidable movement upon the felly, independently of the tire, and additional resilient members arranged upon said connecting means and allowing of the inwardly yielding movement of said segments and exerting an outward thrust upon said segments during relaxation.

2. A wheel of the type described, including a hub, a felly and rim and spokes effecting connection between the hub and felly, a resilient tire, tubular segments closely embracing said tire and felly and extending beyond the same, means effecting connection between the tire and felly, said segments having radially slidable movement upon the felly, independently of the tire, additional resilient members arranged upon said connecting means and allowing of the inwardly yielding movement of said segments and exerting an outward thrust upon said segments during relaxation, and an elastic connection between said segments.

In testimony whereof, I affix my signature, in presence of two witnesses.

MARRY P. DYSART.

Witnesses:
H. W. LAZING,
R. E. MILLER.